(12) United States Patent
Thomas et al.

(10) Patent No.: US 7,123,134 B2
(45) Date of Patent: Oct. 17, 2006

(54) METHODS AND APPARATUSES FOR PROVIDING STROBE EFFECTS FOR WHEEL ILLUMINATION SYSTEMS AND WHEEL LIGHTING SYSTEMS

(75) Inventors: Mark Thomas, Cupertino, CA (US); Joel Osias, San Jose, CA (US)

(73) Assignee: SET Industries Corporation, Fremont, CA (US)

( * ) Notice: Subject to any disclaimer, the term of this patent is extended or adjusted under 35 U.S.C. 154(b) by 0 days.

(21) Appl. No.: 10/898,424

(22) Filed: Jul. 23, 2004

(65) Prior Publication Data

US 2005/0030756 A1 Feb. 10, 2005

Related U.S. Application Data

(60) Provisional application No. 60/493,541, filed on Aug. 8, 2003.

(51) Int. Cl.
*B60Q 1/00* (2006.01)
(52) U.S. Cl. ............... 340/435; 340/426.33; 340/468; 362/500; 362/459
(58) Field of Classification Search ............ 340/435, 340/426.33, 466, 468, 691.1; 362/500, 487, 362/509, 459
See application file for complete search history.

(56) References Cited

U.S. PATENT DOCUMENTS

| | | | |
|---|---|---|---|
| 1,643,593 A | 9/1927 | Styer et al. | |
| 2,177,467 A | 4/1939 | Sunderhauf | |
| 2,526,548 A | 10/1950 | Franklin | |
| 3,699,367 A | 10/1972 | Thomas | |
| 3,760,351 A | 9/1973 | Thomas | |
| 4,229,728 A | 10/1980 | Tremba | |
| 4,405,872 A | 9/1983 | Thomas | |
| 4,429,232 A | 1/1984 | Thomas et al. | |
| 4,430,692 A | 2/1984 | Papadakis | |
| 4,504,761 A | 3/1985 | Tiplett | |
| 4,539,496 A | 9/1985 | Thomas et al. | |
| 4,761,577 A | 8/1988 | Thomas et al. | |
| 4,775,919 A | 10/1988 | Pearsall et al. | |
| 5,016,144 A | 5/1991 | DiMaggio | |
| 5,548,274 A * | 8/1996 | Anderson et al. | 340/468 |
| 5,558,426 A | 9/1996 | Cabanatan et al. | |
| 5,650,681 A | 7/1997 | DeLerno | |

(Continued)

FOREIGN PATENT DOCUMENTS

DE 19922570 A1 11/2000

(Continued)

*Primary Examiner*—Toan N. Pham
(74) *Attorney, Agent, or Firm*—Blakely, Sokoloff, Taylor & Zafman LLP.

(57) ABSTRACT

Methods and apparatuses for providing strobe effects for a wheel lighting system or wheel illuminating system. For one embodiment, a strobe device for a wheel lighting system includes a tachometer to determine a rotational frequency of a wheel, and a strobing element capable of operating in a first mode and a second mode. When operating in the first mode, the strobing frequency is related to the rotational frequency of the wheel. When operating in the second mode the strobing frequency is independent of the rotational frequency of the wheel. For one embodiment, the lighting elements, tachometer, and other components of the system are implemented completely within the rotating reference frame of the wheel. One embodiment of the invention provides a wheel illumination system having one or more strobing light source assemblies positioned within a rotating reference frame of the wheel to provide stroboscopic effects for the wheel's street side surfaces.

24 Claims, 3 Drawing Sheets

U.S. PATENT DOCUMENTS

| | | |
|---|---|---|
| 5,800,035 A | 9/1998 | Aichele |
| 5,934,882 A | 8/1999 | Olney et al. |
| 6,030,106 A | 2/2000 | Johnson |
| 6,220,733 B1 | 4/2001 | Gordon |
| 6,291,901 B1 | 9/2001 | Cefo |
| 6,530,683 B1 | 3/2003 | Ohkohdo et al. |
| 6,565,243 B1 | 5/2003 | Cheung |
| 6,612,726 B1 * | 9/2003 | Gloodt et al. ............... 362/500 |
| 6,641,041 B1 * | 11/2003 | Olds et al. .................. 235/454 |
| 6,776,458 B1 | 8/2004 | Wang |
| 6,789,928 B1 * | 9/2004 | Khan ........................ 362/500 |
| 6,809,426 B1 | 10/2004 | Naar et al. |
| 6,817,743 B1 * | 11/2004 | Sharper ..................... 362/500 |
| 2002/0136020 A1 | 9/2002 | Hung |
| 2003/0223243 A1 | 12/2003 | Miller |
| 2004/0037088 A1 | 2/2004 | English et al. |
| 2005/0030755 A1 | 2/2005 | Thomas et al. |
| 2005/0099820 A1 | 5/2005 | Cooper |

FOREIGN PATENT DOCUMENTS

| | | |
|---|---|---|
| DE | 10055882 A1 | 5/2002 |
| FR | 2407599 A | 6/1979 |
| GB | 2307044 A | 5/1997 |
| JP | 2001258234 A | 9/2001 |
| RU | 2248084 C2 | 3/2005 |

* cited by examiner

METHODS AND APPARATUSES FOR PROVIDING STROBE EFFECTS FOR WHEEL ILLUMINATION SYSTEMS AND WHEEL LIGHTING SYSTEMS

CLAIM OF PRIORITY

This application is related to, and hereby claims the benefit of provisional application No. 60/493,541, entitled "Wheel Illumination Strobe Effects" which was filed Aug. 8, 2003. This application is related to, and hereby incorporates by reference, application Ser. No. 10/812,573, entitled "Methods and Apparatuses for Illuminating Wheel Surfaces" which was filed on Mar. 29, 2004

FIELD

Embodiments of the invention relate generally to the field of wheel lighting and wheel illumination systems and more specifically to providing a stroboscopic effect for such systems.

BACKGROUND

For many years there has been an interest in wheel ornamentation and, in particular, wheel lighting and strobing for automobiles, motorcycles, bicycles, and other wheeled vehicles.

Wheel lighting and illumination systems can enhance the aesthetics of the wheels and the vehicle. The primary purpose of these systems is to display the wheel under low light conditions. However when the vehicle is in motion the details of the wheel are lost because of the blurring of the wheel image. Therefore an enhancement to a wheel lighting system or a wheel illumination system is a stroboscopic system that can appear to freeze or slow the rotation of the wheel such that the detail of the wheel can be seen even when the vehicle is in motion.

Beyond allowing the wheel or attached lighting elements to be viewed while moving, a strobe-enhanced system provides other aesthetically appealing effects.

Generally speaking a strobe lighting system can be used to make objects undergoing repetitive motion appear to slow or freeze (remain stationary). Conventional electronic stroboscopes use a flashtube to intermittently illuminate a moving object. Such devices can be synchronized with the rotational frequency of a device to allow portion of a quickly rotating device to be viewed more clearly. This type of stroboscopic effect has been used in conjunction with a wheel lighting system to produce the illusion of slowing or freezing the motion of light emitting diodes (LEDs) mounted to a wheel cover. This reduces the blurring of the light from the LEDs due to the vehicles motion and allows the lighting elements to be seen more clearly while the vehicle is in motion. Such a system is generally described in U.S. Pat. No. 5,016,144 to Dimaggio, issued May 14, 1991, entitled "Illuminating Wheel Covers" ('144).

Another system uses such a stroboscopic effect to produce the illusion of slowing or freezing the motion of the tire with a light source that is attached to a vehicle frame. Such a system is generally described in U.S. Pat. No. 5,548,274 to Anderson, issued Aug. 20, 1996, entitled "Strobe Light for Vehicle Tire and Wheel" ('274).

Both the '144 patent and the '274 patent have distinct disadvantages. For example, neither addresses the difficulty of low frequency strobing that is considered distractive to the operators of other vehicles. The flashing of effect of the low frequency strobing may constitute a serious driving hazard and such flashing lights may be illegal in certain circumstances and jurisdictions.

Additionally, for such systems, at least one component of a tachometer, used to determine the rotational frequency of the wheel and set the strobing frequency, is attached to the vehicle frame. Such systems therefore are difficult to install and typically alter the vehicle permanently. That is, systems requiring components to be installed in or affixed to the body of the vehicle are more difficult to install and repair. This is due not only to increased installation processes, but also to the fact that vehicle design varies considerably between manufacturers and models, making it difficult to generalize installation procedures.

SUMMARY

Methods and apparatuses for providing a strobing effect for a wheel lighting system or a wheel illumination system are disclosed. For one embodiment of the invention, a strobe device for a wheel lighting system includes a tachometer to determine a rotational frequency of a wheel, and a strobing element capable of operating in a first mode and a second mode. When operating in the first mode, the frequency of oscillation of the strobing element is related to the rotational frequency of the wheel. When operating in the second mode the frequency of oscillation of the strobing element is independent of the rotational frequency of the wheel. Such an embodiment achieves one of the objects of this invention, which is to control the strobe effect (synchronous or asynchronous) such that it is not a distraction or hazard to fellow motorists.

For one embodiment of the invention the lighting elements, tachometer, and other components of the system are implemented completely within the rotating reference frame of the wheel. Such an embodiment achieves one of the objects of this invention, which is to provide a system that is easier to manufacture, easier to install, and easier to maintain.

One embodiment of the invention provides a wheel illumination system having one or more strobing light source assemblies positioned within a rotating reference frame of the wheel to provide stroboscopic effects for the wheel's street side surfaces. For such an embodiment, the light source assemblies of the wheel illumination system are positioned such that a sufficient amount of light from the light source assemblies is directed toward the surface of the wheel so that an amount of light reflected from the surface of the wheel is greater than an amount of light from the light source assemblies directed away from the surface of the wheel.

One embodiment of the invention provides two or more independently strobed sets of lighting elements to provide stroboscopic effects to corresponding features of the wheel. Such an embodiment achieves one of the objects of this invention, which is to provide a system that implements more complex stroboscopic effects.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

System

Embodiments of the invention may be applied to a wheel lighting system, which displays lighting elements on a wheel. The lighting elements are viewed directly by an observer. Additionally, or alternatively, embodiments of the invention may be applied to a wheel illumination system as described in more detail below.

A stroboscopic wheel lighting system (wheel strobing system) is one in which the light from an illuminating wheel system is modulated such that it can cause some or all of the wheel features to appear to freeze, roll slowly forward, roll backwards, or produce other effects.

Figure 1:
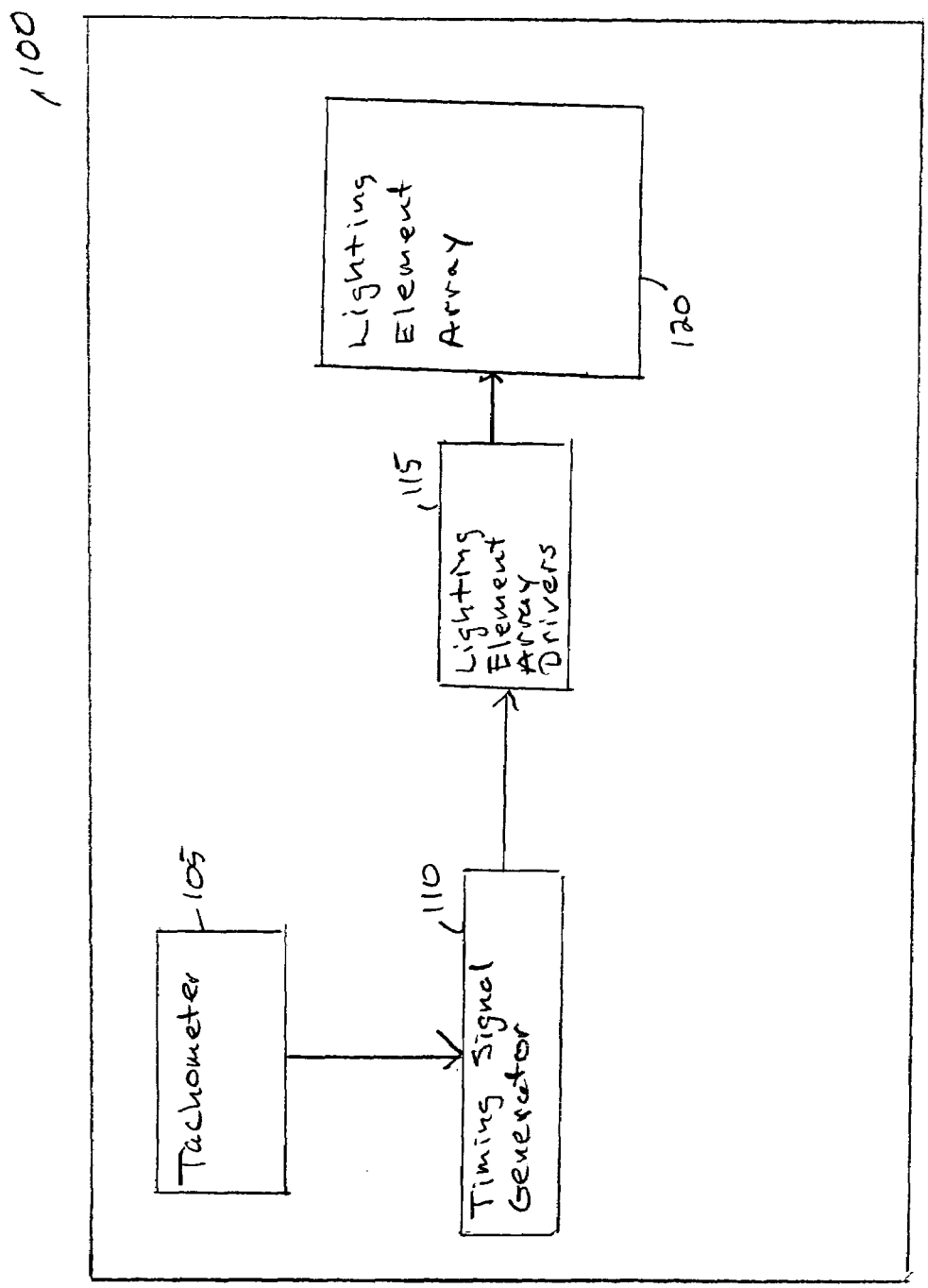
FIG. 1 illustrates a wheel strobing system in accordance with one embodiment of the invention.

FIG. 1 illustrates a wheel strobing system in accordance with one embodiment of the invention. Wheel strobing system 100, shown in FIG. 1, includes a tachometer 105. The tachometer provides signals to the timing signal generator 110. The signals from the tachometer 105 are related to the rotational frequency of the wheel. The timing signal generator 110 supplies a set of signals that control the on and off duty cycles of the lighting element (LE) array drivers 115 thus controlling the strobe drivers to the intended LE arrays 120 to cause the desired strobe effect. As used herein, the term "lighting element" or alternatively "light source assembly" includes a light source, which may be any conventional light source, including light-emitting diodes (LEDs), filament-based, gas-based, laser, or combinations thereof, and a light source in combination with other elements for directing or shielding the light from the light source.

In accordance with one embodiment of the invention all of the components of the wheel strobing system 100 may be implemented within the rotational reference frame of the wheel. As used herein, the term "rotating reference frame of the wheel" includes any surfaces that are rotating at the same rotational frequency as the wheel and around the same axis as the wheel. The rotating reference frame, therefore, includes the wheel, the tire, the lugs, the lug nuts, the hub, the valve stem, the drum, the hat, the disc, etc. The rotating reference frame further includes attached devices with bearing floating surfaces that allow some portion of the device to rotate at a different rotational frequency than the wheel or in the extreme case not rotate. In accordance with one embodiment of the invention the lighting elements or light source assemblies are positioned on a portion of the wheel selected from the group consisting of a wheel rim, a rim flange, a wheel center cap, a disk, a hat, a spoke, and a combination thereof.

The processes and components of a wheel strobing system in accordance with various alternative embodiments of the invention are described in greater detail below.

Strobing

In accordance with one embodiment of the invention, a strobe effect is implemented that occurs when the frequency of modulation of the wheel lighting system or wheel illumination system is at or near $N*f0$, where $f0$ is the rotational frequency of the wheel and N is the number of degrees of symmetry of the feature on the wheel for which it is desired to create stroboscopic effects (e.g., slow or freeze or reverse direction). For example for freezing a wheel with 6 symmetrically placed spokes, N equals six. The same wheel may have a center cap that has 4 degrees of symmetry. To achieve a stroboscopic effect for the center cap, N should is adjusted to 4.

The strobe effect may be either synchronous or asynchronous. The strobe effect is synchronous if the strobe frequency can track the rotation frequency of the wheel $f0$ It is asynchronous if the strobe frequency is not dependent on the rotational frequency of the wheel $f0$. One example of an asynchronous strobe is a strobe whose frequency is constant. Another example of an asynchronous strobe is a strobe whose frequency is modulated by any number of waveforms, i.e. triangle, sawtooth, sinewave, etc. such that at a fixed vehicle speed the wheel appears to go through, for example, the following cyclic states: (a) blurred image, (b) slowed rotation either clockwise or counterclockwise, (c) freeze, (d) slowed rotation either counterclockwise or clockwise, and finally returning to (e) blurred.

For one embodiment of the invention a wheel strobing system is provided that reduces the distraction to other vehicle operators that is inherent in prior art strobing schemes. Paramount to any wheel illuminating system is providing a safe non-distracting environment for other vehicle operators. When the lighting elements of a wheel strobing system are modulated then that same system could be a hazardous distraction. For example, consider a vehicle with 5 spoke wheels with tires of 24" diameter traveling at 8.5 mph then a single exposure synchronous strobe, i.e. M=1, would have frequency of 10 cycles/sec. This would appear to the observer as a wheel turn on and off. This would certainly be very distractive. As the vehicle speed increases the synchronous strobe frequency will increase. At 42.5 mph the single exposure synchronous strobe would have a frequency of 50 cycles per second. For most human eyes it is not possible to discern that the lighting elements are being modulated at 50 cycles per second and greater, because of the persistence period of each image as perceived by the human eye. A simplified explanation follows. Consider a series of images presented to the eye. Suppose each image is "on" for time T1 and off for a time T2. Consider the nth image in this series of images. Further consider that the nth image sustains itself in the human eye for a period T3 after the image is off. If T3 is greater than T2 then the nth image overlaps the n+1th image and the images appear to transpose each other as they overlap each other. It is this phenomenon that is used in motion pictures and television to convey the appearance of continuity between frames. At the beginning of each frame, part of the previous frame still remains, and as the frame continues the previous frame begins to fade until the next frame is reached. In the case of the strobed wheel the nth image is the same as the n+1th image. There will be no perceptible gap between images of the wheel if T3 is greater than T2. Since it is a desirable feature to have no blinking or flickering effect while strobing then the synchronous strobe will only be engaged when the condition T3 is greater than T2 is met. For one embodiment of the invention the lighting elements run in a state in which this condition is met in certain circumstances and conditions. Examples of such states are: (a) f0=0, i.e. lighting elements are continuously "on", (b) f0=f1 where f1 is some frequency that meets the T3 greater than T2 condition.

Figure 2:
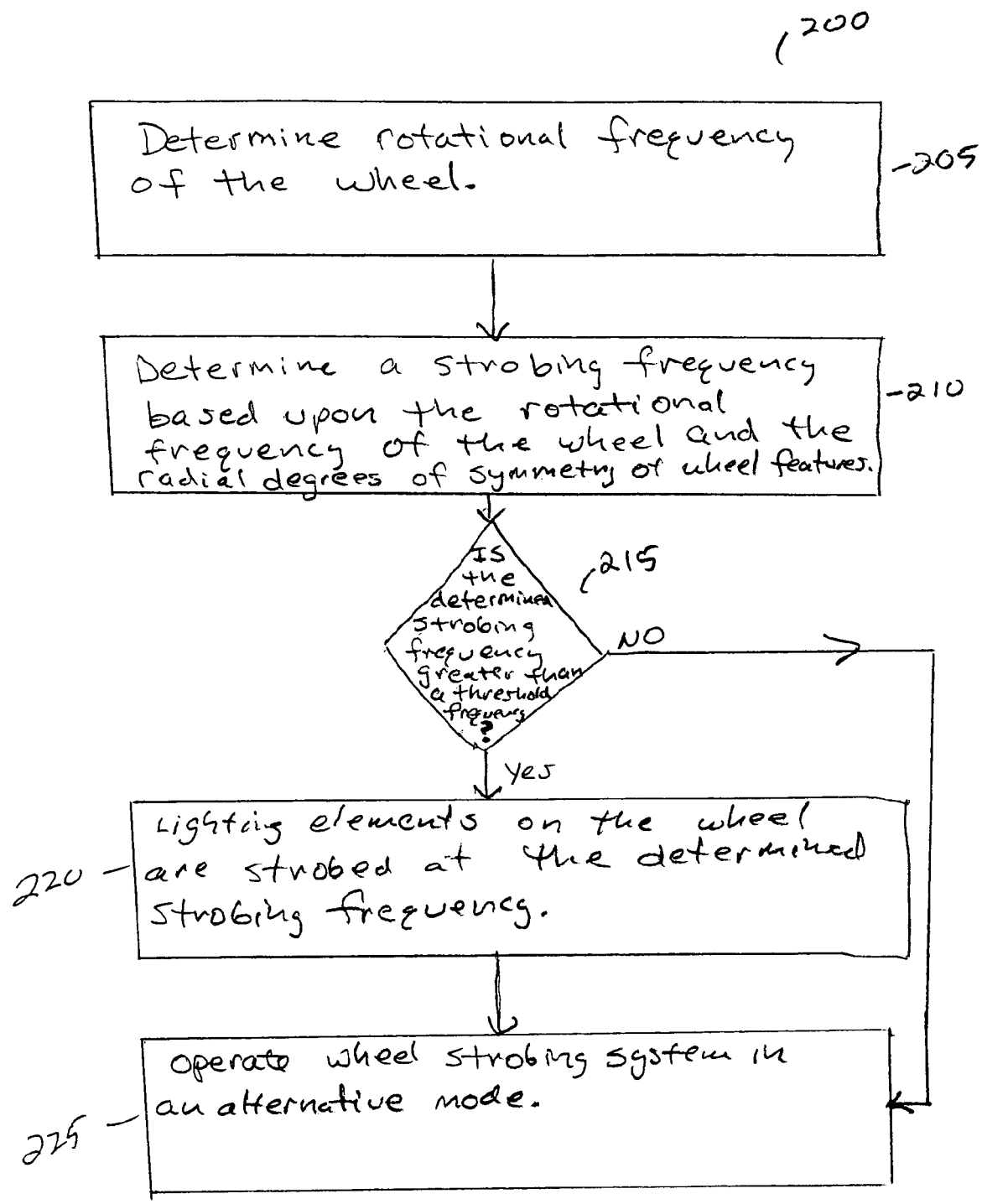
FIG. 2 illustrates a process by which the strobing frequency for a wheel strobing system is determined in accordance with one embodiment of the invention.

FIG. 2 illustrates a process by which the frequency of oscillation of a strobing element (strobing frequency) for a wheel strobing system is determined in accordance with one embodiment of the invention. Process 200, shown in FIG. 2, begins at operation 205 in which the rotational frequency of the wheel is determined. The rotational frequency may be determined using a conventional tachometer as know in the art. Alternatively, a tachometer in accordance with on embodiment of the invention, as described more fully below, may be used to determine the rotational frequency of the wheel.

At operation 210 a strobing frequency is determined based upon the rotational frequency of the wheel and the radial degrees of symmetry of the wheel features for which it is desired to create stroboscopic effects. Such features may include, for example, spokes, hub, center cap, designs, text, etc. The strobing frequency may be determined so as to cause the wheel features to appear motionless, or may be determined so as to cause the wheel features to appear to move forward or backward at some desired rotational frequency.

At operation 215 a comparison is made between the determined strobing frequency and a threshold frequency. The threshold frequency may be selected to be at or above a frequency at which flickering will not be perceptible to the human eye. Empirically, this frequency has been determined to be approximately 60 Hz, for systems employing conventional lighting elements. For one embodiment of the invention the wheel strobing device includes a comparator which may be implemented as a stand-alone hardware device or within a processor.

If at operation 215 the determined strobing frequency is at or above the threshold frequency, then the lighting elements on the wheels are strobed at the determined strobing frequency at operation 220. If at operation 215 the determined strobing frequency is below the threshold frequency, then the wheel strobing system is operated in an alternative mode at operation 225. For example, as discussed above, the wheel strobing system may be operated in DC mode in which the lighting elements are not strobed, or the lighting elements may be strobed at some default strobing frequency at or higher than the threshold frequency.

Tachometer

Figure 3:
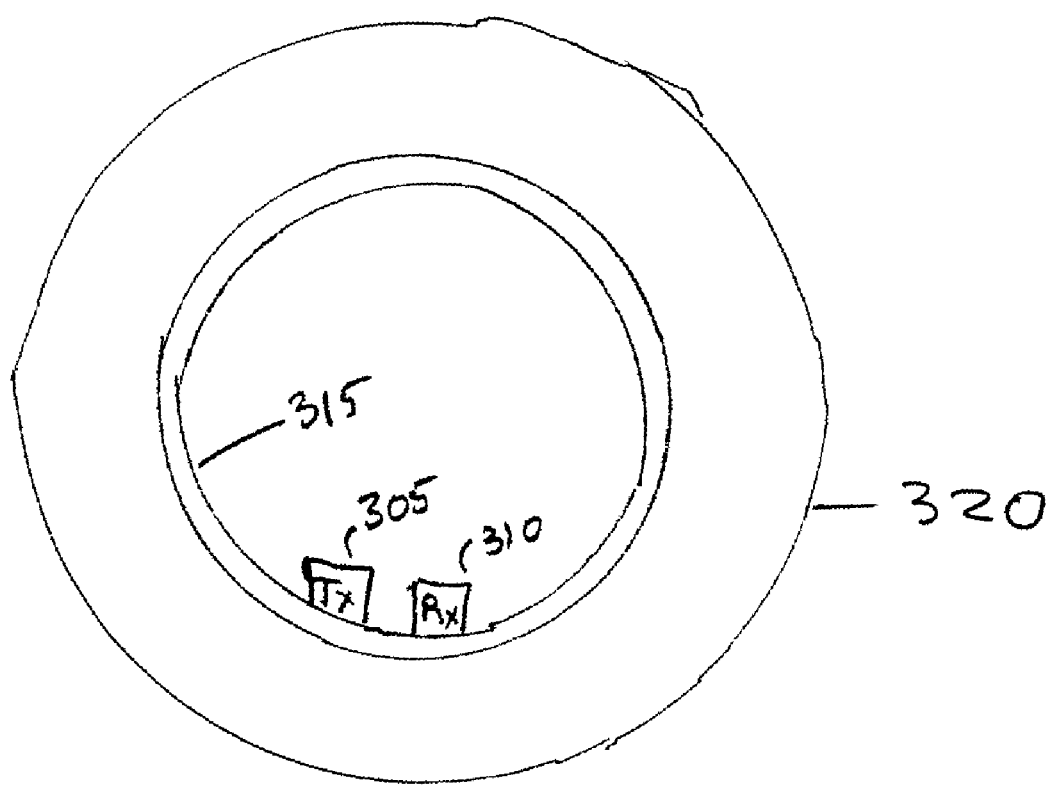
FIG. 3 illustrates implementation of a tachometer in a wheel strobing system in accordance with one embodiment of the invention.

In accordance with one embodiment of the invention a tachometer is implemented completely within the rotating reference frame of the wheel. FIG. 3 illustrates implementation of a tachometer in a wheel strobing system in accordance with one embodiment of the invention. System 300, shown in FIG. 3, includes a transmitter 305 and a receiver 310 mounted to a wheel rim 315 of wheel 320. The transmitter 305 is an infrared (IR) transmitter that may be modulated or unmodulated. The transmitter 305 is mounted on the wheel such that a portion of the output energy is directed radially outwards and reflected by reference objects (i.e., objects passed as the wheel 320 rotates). The IR receiver 310 receives some portion of the reflected energy. The receiver 310 may be constructed such that the modulation scheme used on the transmitter 305 assists the receiver 310 in achieving a higher signal to noise ratio. For example if the IR signal is modulated with a 10 kHz sine wave then the receiver 310 may use a bandpass filter around 10 kHz, rejecting all other IR signals received (from a variety of potential black body radiators) as noise. Both the transmitter 305 and the receiver 310 may be mounted to the wheel 320 such that the object of implementing the entire wheel strobing system is achieved. IR is easily collimated so the transmitter 305 and receiver 310 can be directly adjacent to each other, as shown in FIG. 3.

In accordance with an alternative embodiment of the invention, the tachometer is implemented using an ultrasonic transmitter/receiver pair instead of the IR transmitter/receiver pair described above in reference to FIG. 3.

In accordance with various alternative embodiments of the invention, the tachometer may be implemented in accordance with a number of conventional schemes in which some of the tachometer components are implemented outside of the rotational reference frame of the wheel (e.g., the frame of the vehicle). For example, a tachometer may be implemented using a magnetic coupling between a rotating object (the wheel or something on the wheel) and a non-rotating object (mounted on the vehicle).

Ranging Methods

For one embodiment of the invention, implementing either an IR or sonic transmitter receiver pair, the transmitter is pulsed at some appropriate frequency. The receiver will receive the pulsed energy after it has been reflected. The time-of-flight (TOF) is measured, i.e. the delta between the time the signal is sent and the time the signal is received. The minimum time-of-flight is when the transmitter/receiver pair is closest to the surface of the road. Thus indicating wheel rotation. As noted, such an embodiment could be implanted using either IR or sonic transceivers, however the TOF of the sonic signals would be much longer and therefore could be enabled with less expensive electronics.

For one embodiment of the invention the rotational frequency is determined using an amplitude modulation scheme based upon the periodic change in the amplitude of the received signal. For example, for one embodiment of the invention, a fast fourier transform (FFT) is computed determining the fundamental frequency component, thus the rotational frequency of the wheel. For an alternative embodiment, a peak detection circuit is implemented. This method assumes that there is only one peak (i.e., when the transmitter is close to the surface of the road). Both of these embodiments may be implemented by a simple analog to digital conversion circuit front ending a microprocessor with the appropriate program.

Signal Generator

For one embodiment of the invention, the control signal generator functions are: (a) determine the rotational frequency from the analog tachometer signal, (b) generate the gating signals passed on the rotational frequency, the number of degrees of symmetry of the wheel feature to be strobed, and the order of the multiple exposures, (c) determine if the resultant frequency is high enough to meet the T3 greater than T2 criteria described above. Functions (b) and (c) can be implemented by a myriad of methods to one skilled in the art of digital electronics. For example a processor with an associated memory can be programmed to accomplish these functions. For one embodiment of the invention, the processor has implemented thereon a comparator to effect the comparison between the determined strobing frequency and a threshold frequency as described in reference to operation 215 of process 200. The pertinent constants, e.g. degrees of symmetry, order of exposure, could be either factory programmed or user input. The frequency of the tachometer signal may be determined in a number of ways, which will be apparent to those skilled in the art.

General Matters

While generally applicable to a wheel lighting system as known in the art, embodiments of the invention are equally applicable to the wheel illumination system described in patent application Ser. No. 10/812,573, entitled "Methods and Apparatuses for Illuminating Wheel Surfaces" which was filed on Mar. 29, 2004 and reference above. Such a wheel illumination system may be comprised of one or more light sources positioned within the rotating reference frame of the wheel. Some of the light from the one or more light sources is incident upon the wheel surface and is reflected from the wheel surface. The amount of such reflected light is greater than the amount of light, from the light source, that is directed away from the wheel surface. For one such embodiment, each light source is a part of a light source assembly that may include elements that help reduce the amount of light, from the light source assemblies, that is directed away from the wheel surface. For such embodiments, the amount of light reflected from the wheel surface is greater than the amount of light, from the light source assemblies, that is directed outward from the wheel surface. That is, the amount of light from the light sources that is directed past an observation plane located beyond the light source assemblies, is less than the amount of light, from the light source assemblies, reflected from the surface of the wheel. Additionally, or alternatively, for other such embodiments of a wheel illumination system, various light-directing devices are employed to direct light from the light sources toward the wheel surface and to help reduce the amount of light, from the light sources, directed away from the wheel surface that is incident in a specified observation region. For still other embodiments, the surface of the wheel may be modified to help direct the light In accordance with one embodiment of the invention, multiple wheel strobing systems as described above in reference to FIG. 1 may be implemented as one system to provide the capability of strobing multiple features of the wheel simultaneously. For example, a system may implement two arrays each with its own control signal, and each illuminating a distinct feature of the wheel. The distinct features, which are individually illuminated and strobed may have different degrees of symmetry. As an example, one illuminating sub-system could illuminate and strobe the wheel's spokes, while another illuminating sub-system illuminates and strobes the wheel's center cap. If the wheel has 5 spokes and a hexagon shaped center cap, for example, the illuminating sub-systems could make the spokes appear to be rotating at a different speed and or direction than the center cap. Note that double, triple, etc., can be achieved by strobing the system at a frequency of M*N*f0, where M is the degree of multiple exposure. M is one for standard single exposure, M is two for double exposure, and so on.

An embodiment of the invention has been described as a process having various operations. Such operations are exemplary and may be described in their most basic form, but operations can be added to or deleted from the process without departing from the basic scope of the invention in accordance with various embodiments. For example, process 200, described above in reference to FIG. 2, may include additional operations in which multiple strobing frequencies are determined and analyzed. The multiple strobing frequencies may be determined, based in-part upon the degrees of symmetry of corresponding wheel features. For such embodiments, strobing frequencies may be determined so as to cause multiple wheel features to appear motionless, or may be determined so as to cause multiple wheel features to appear to move forward or backward at some desired rotational frequency. For one embodiment of the invention, strobing frequencies may be determined so as to cause each of the multiple wheel features to appear to move forward or backward at distinct corresponding rotational frequencies.

The operations of various embodiments of the invention may be effected by hardware or firmware components or may be embodied in machine-executable instructions. An embodiment of the invention may be provided as a computer program product that may include a machine-accessible medium having stored thereon instructions, which may be used to program a computer (or other electronic devices) to perform a process according to the invention as described above.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A wheel strobing device comprising:
    a tachometer unit to couple to a rotational reference frame of a wheel to determine a rotational frequency of the wheel;
    a strobing element to couple to the rotational reference frame of the wheel and the tachometer, the strobing element capable of operating in a first mode and a second mode, wherein the frequency of the strobing element is related to the rotational frequency of the wheel and to a number of degrees of symmetry of a wheel feature when operating in the first mode and the frequency of the strobing element is independent of the rotational frequency of the wheel when operating in the second mode;
    a set of one or more lighting elements to couple to the rotational reference frame of the wheel and the strobing element, the set to operate under the control of the strobing element; and
    a comparator to compare the frequency of the strobing element with a threshold frequency such that if the frequency of the strobing element is higher than the threshold frequency, the wheel strobing device operates in the first mode and if the frequency of the strobing element is lower than the threshold frequency, the wheel strobing device operates in the second mode.

2. The wheel strobing device of claim 1 wherein the wheel feature is selected from the group consisting of spokes, hub, center cap, designs, text, and combinations thereof.

3. The wheel strobing device of claim 1 further comprising:
one or more additional strobing elements wherein the strobing frequency of each additional element when operating in the first mode is related to the rotational frequency of the wheel and to a number of degrees of symmetry of a corresponding wheel feature.

4. The wheel strobing device of claim 1 wherein the set of one or more lighting elements includes lighting elements selected from the group consisting of light-emitting diodes, filament-based light elements, gas-based light elements, lasers, and a combination thereof.

5. The wheel strobing device of claim 1 wherein the set of one or more lighting elements are positioned on a portion of the wheel selected from the group consisting of a wheel rim, a rim flange, a wheel center cap, a disk, a hat, a spoke, and a combination thereof.

6. The wheel strobing device of claim 1 wherein the tachometer unit includes a transceiver implemented on the wheel and determining wheel rotation in reference to a modulation scheme.

7. The wheel strobing device of claim 6 wherein the transceiver is an infrared transceiver.

8. An assembly comprising:
a wheel;
a wheel illumination system having one or more strobing light source assemblies coupled to a rotating reference frame of the wheel, such that a sufficient amount of light from the light source assemblies is directed toward a surface of the wheel so that an amount of light reflected from the surface of the wheel is greater than an amount of light from the light source assemblies directed away from the surface of the wheel, wherein the one or more strobing light source assembles have a first strobing frequency related to or a multiple of the rotational frequency of the wheel, and a second strobing frequency that is unrelated to the rotational frequency and imperceptible to the human eye and;
a tachometer coupled to the rotating reference frame of the wheel and wheel illumination system to determine the rotational frequency of the wheel and control the strobing frequency of the strobing light source assemblies.

9. The assembly of claim 8 wherein the one or more light source assemblies are light sources selected from the group consisting of light-emitting diodes, filament-based light elements, gas-based light elements, lasers, and a combination thereof.

10. The assembly of claim 9 wherein the one or more light source assemblies are coupled to a portion of the wheel selected from the group consisting of a wheel rim, a rim flange, a wheel center cap, a disk, a hat, a spoke, and a combination thereof.

11. The assembly of claim 8 wherein the tachometer unit includes a transceiver to determine wheel rotation in reference to a modulation scheme.

12. The assembly of claim 11 wherein the transceiver is an infrared transceiver.

13. The assembly of claim 8 wherein the second strobing frequency is zero and light source assemblies produce constant light.

14. A method comprising:
determining a rotational frequency of a wheel having one or more features and a set of lighting elements attached thereto;
determining a strobing frequency for the set of lighting elements dependent on a product of at least the rotational frequency of the wheel and a radial degree of symmetry of at least one of the features;
comparing the determined strobing frequency to a threshold frequency; and
strobing the lighting elements at the determined strobing frequency if the determined strobing frequency is higher than the threshold frequency, otherwise strobing the lighting elements at a frequency independent of the determined strobing frequency.

15. The method of claim 14 wherein the independent frequency for strobing the lighting elements comprises a default frequency.

16. The method of claim 14 further comprising:
operating the lighting elements in a direct current mode if strobing the lighting elements at the independent frequency.

17. The method of claim 14 wherein the one or more wheel features are features selected from the group consisting of spokes, hub, center cap, designs, text, and combinations thereof.

18. The method of claim 14 wherein the set of lighting elements includes lighting elements selected from the group consisting of light-emitting diodes, filament-based light elements, gas-based light elements, lasers, and a combination thereof.

19. The method of claim 14 wherein the set of lighting elements are positioned on a portion of the wheel selected from the group consisting of a wheel rim, a rim flange, a wheel center cap, a disk, a hat, a spoke, and a combination thereof.

20. The method of claim 14 further comprising:
determining one or more additional strobing frequencies for one or more corresponding additional sets of lighting elements, each additional strobing frequency dependent on a product of at least the rotational frequency of the wheel and a radial degree of symmetry of at least one of the features.

21. A wheel strobing device comprising:
a tachometer mountable within a rotational frame of reference of a wheel and capable of communicating data corresponding to a rotational frequency of the wheel; and
a strobing element capable of receiving the data and, based at least in part on the data, selectively producing one of a first strobing frequency synchronous with the rotational frequency and a second strobing frequency asynchronous with the rotational frequency, the selection being based, at least in part, on the persistence period of an image perceived by the human eye.

22. The wheel strobing device of claim 21, in which the strobing element selectively produces the second strobing frequency if the first strobing frequency would be less than 60 cycles per second.

23. The wheel strobing device of claim 21, in which the strobing element selectively produces the second strobing frequency if the first strobing frequency would result in flickering perceptible to the human eye.

24. The wheel strobing device of claim 21, in which the first strobing frequency is related to a degree of symmetry of a feature of the wheel.

* * * * *